United States Patent Office 3,456,925
Patented July 22, 1969

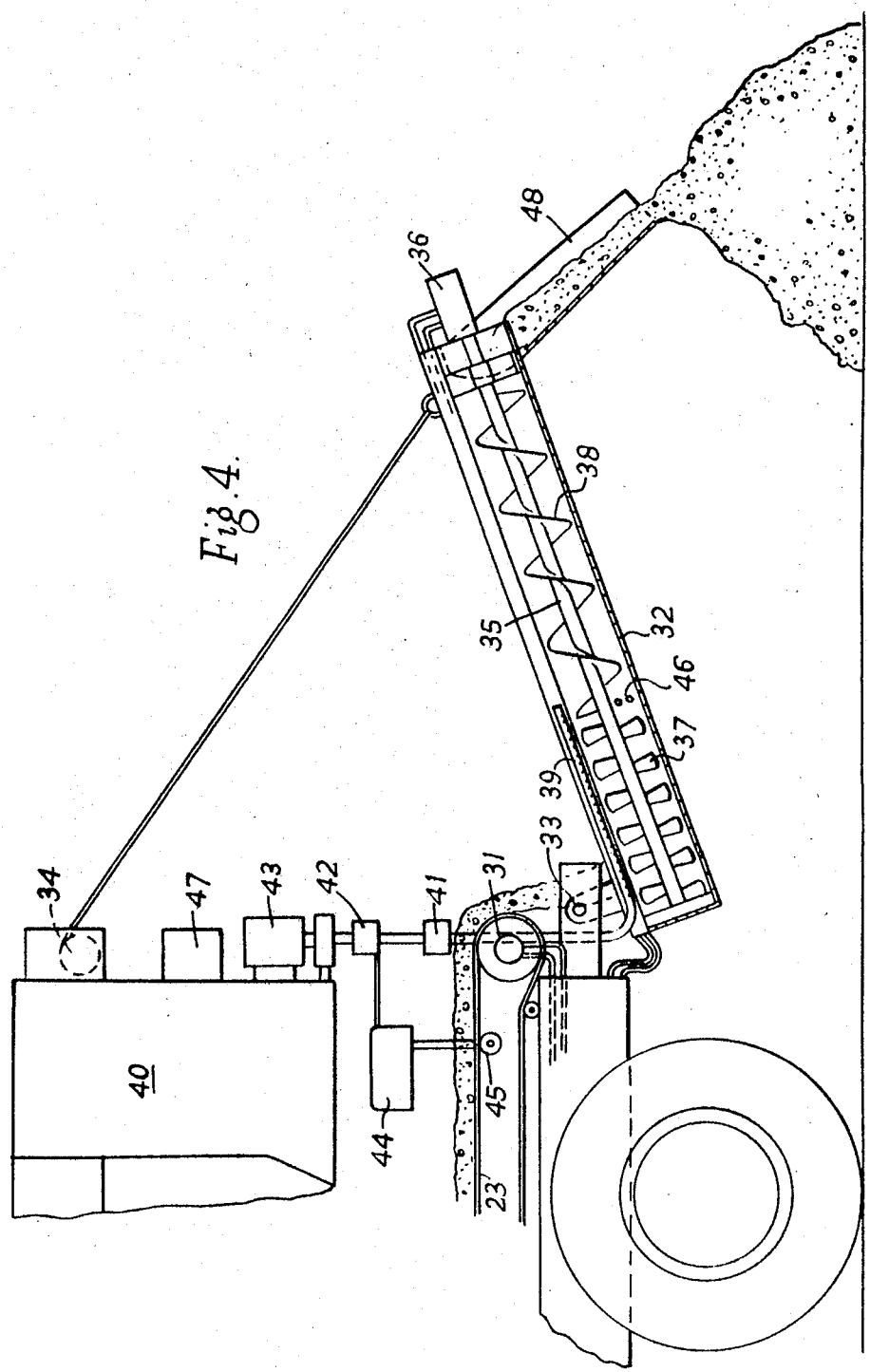

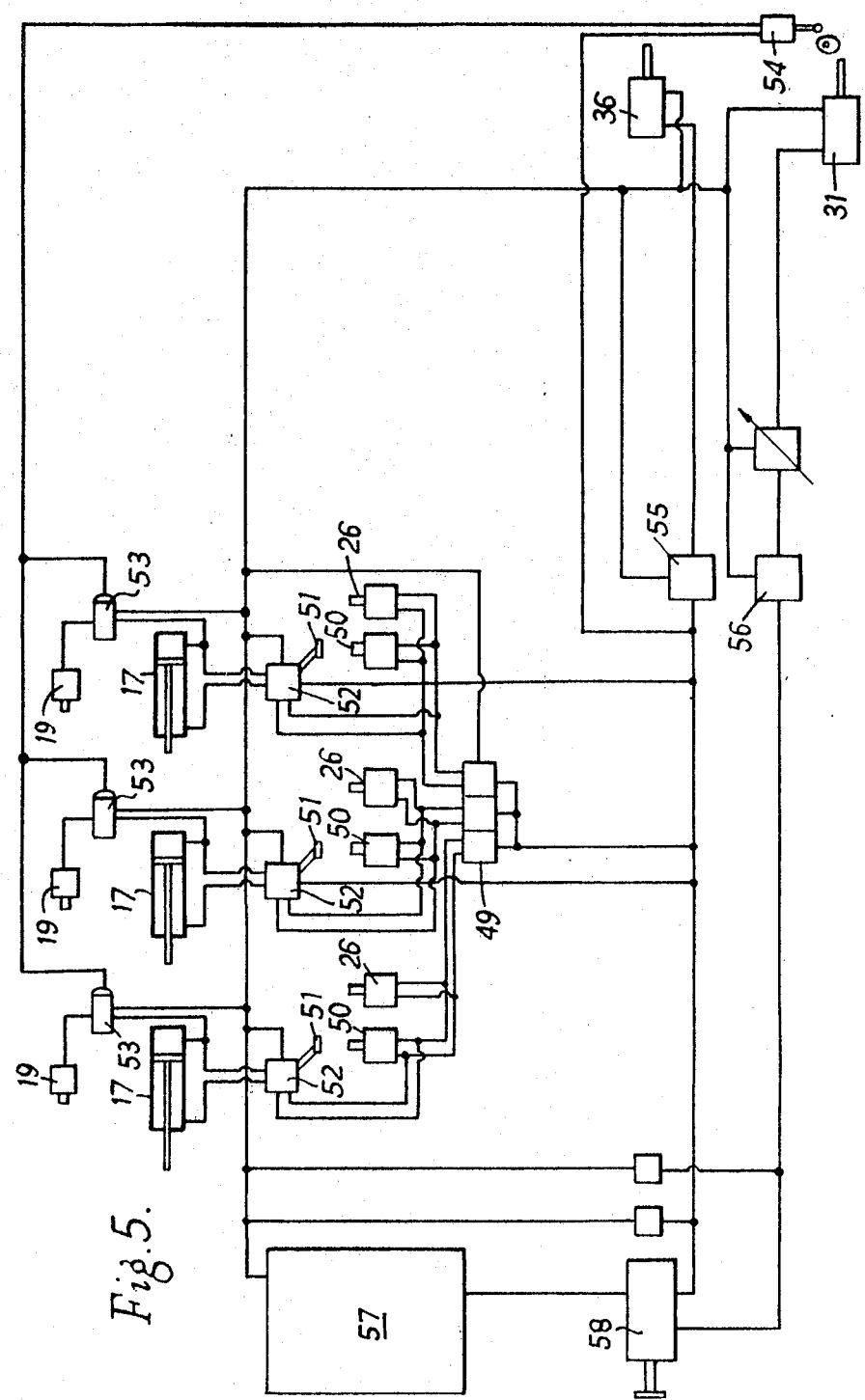

3,456,925
MIXER VEHICLE
Gerard J. Gallagher, Newcastle-upon-Tyne, England, assignor of one-half to Gibson Readymixed Concrete Limited, Gateshead, England, a British company
Filed Sept. 11, 1967, Ser. No. 666,837
Claims priority, application Great Britain, Sept. 21, 1966, 42,053/66
Int. Cl. B60p 1/38, 1/42; B28c 5/14
U.S. Cl. 259—161                              7 Claims

ABSTRACT OF THE DISCLOSURE

A wheeled vehicle for transporting dry-mixed concrete or the like and mixing it with water at the site, this vehicle having a container body with a plurality of doors at its underside individually discharging on to a common conveyor belt which runs fore and aft of the vehicle and delivers the material in a mixing trough at the rear end of the vehicle. Provision is made for raising the belt adjacent any opened door.

---

Figure 1:
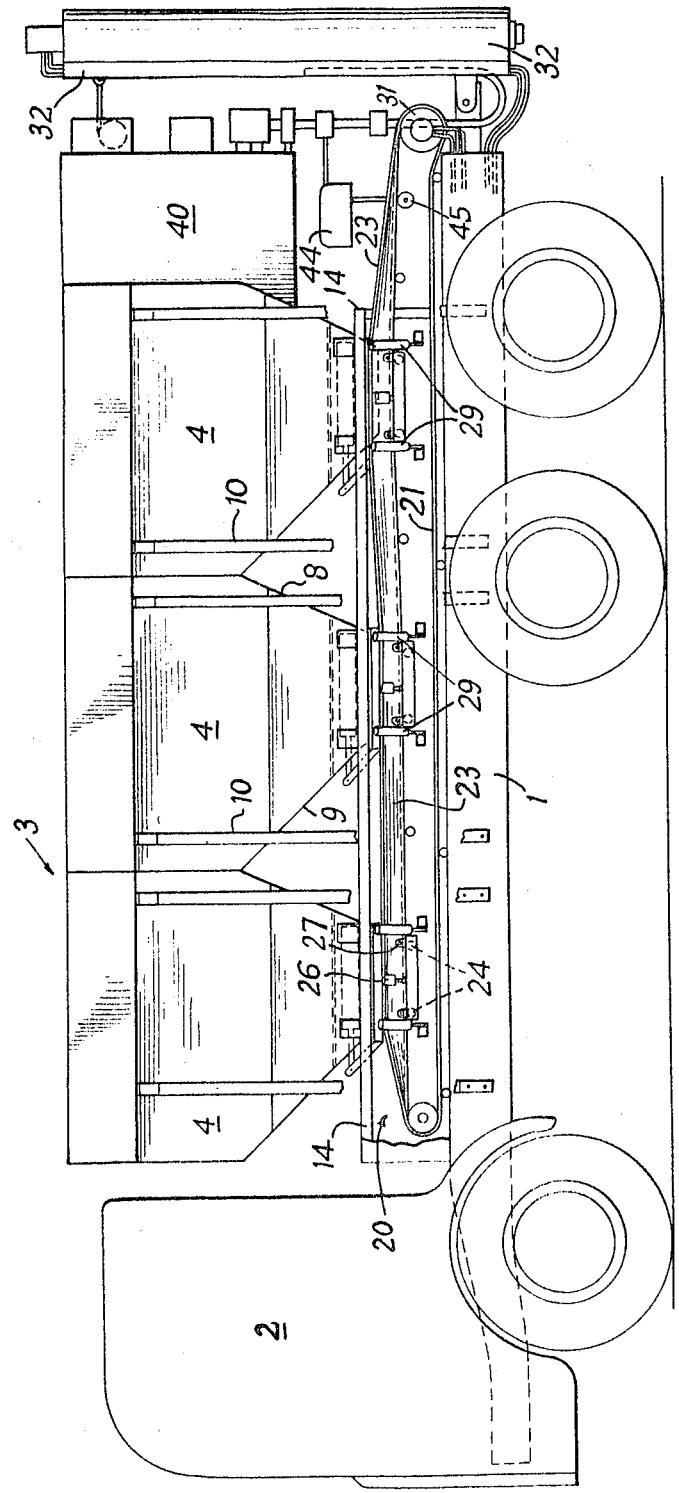

This invention relates to a concrete, mortar or like mixed in the form of a hopper-bodied wheeled vehicle, more especially although not exclusively, a suitably powered wheeled transport vehicle.

In particular it relates to a mixed vehicle of the kind comprising, in combination, a hopper-incorporating container body for concrete, mortar or like material in a substantially dry-mixed condition, in association with this container a mixing chamber of trough form which has mounted for rotation therein a mixing and conveying device, means for receiving said substantially dry-mixed material from the container body and mechanically discharging such material into the mixing chamber, whereby the dry-mixed material is mixed with this water and a controlled and regular discharge of a finally mixed and wet concrete, mortar or the like is simultaneously effected from the mixing chamber.

By the expression "a substantially dry-mixed condition" is meant that the constituents of the concrete mortar or the like, although thoroughly mixed, contain either no water at all, or at most a total moisture content of about 5% only.

The object of the present invention is to provide general improvements in a mixed vehicle of the kind herein referred to, having certain advantages as will be hereinafter described.

By the present invention we provide a mixer vehicle of the kind referred to in which the container body is provided at its lower part with a plurality of discharge apertures and with an individual sliding door controlling each such aperture, and a belt conveyor is disposed beneath the discharge apertures and is adapted to convey to the mixing chamber substantially dry-mixed material issuing from the container body through any such aperture on opening of the door thereof.

Preferably, the container body is divided up into a plurality of separate compartments each formed at the bottom with a discharge aperture having in association therewith its own individual sliding door for controlling the opening and closing of the same. In this case respectively different dry-mixed materials may be contained in the various compartments for discharge selectively as required onto the common belt conveyor below them, or the compartments may all contain dry-mixed material of the same kind whereby individual compartments may be discharged at different destinations and whereby the discharge of the material may be generally facilitated. It is to be borne in mind, however, that the improved mixer vehicle may have an undivided container body but be equipped with a plurality of discharge apertures each having a sliding door.

In accordance with an important feature of this invention, to ensure a controlled discharge of material from the hopper, and to preclude disturbance of material on the belt due to a too-thick deposited layer thereof fouling a succeeding hopper door, provision is made for raising, in automatic response to the opening of a door, the portion of the belt running below this door.

Another feature of the invention lies in the use, in association with each door, of a vibrator to assist in the expulsion of falling material through the discharge aperture controlled by this door. The operation of this vibrator is synchronised with the door opening. Where a hydraulic piston-cylinder unit is used for this opening, the unit may be housed in the container body and surrounded by a protective angle piece carrying the vibrator. The angle piece thus acts as a deflector and secondary vibrator to assist the material flow.

Other features of the invention are set out in the claims.

Figure 2:
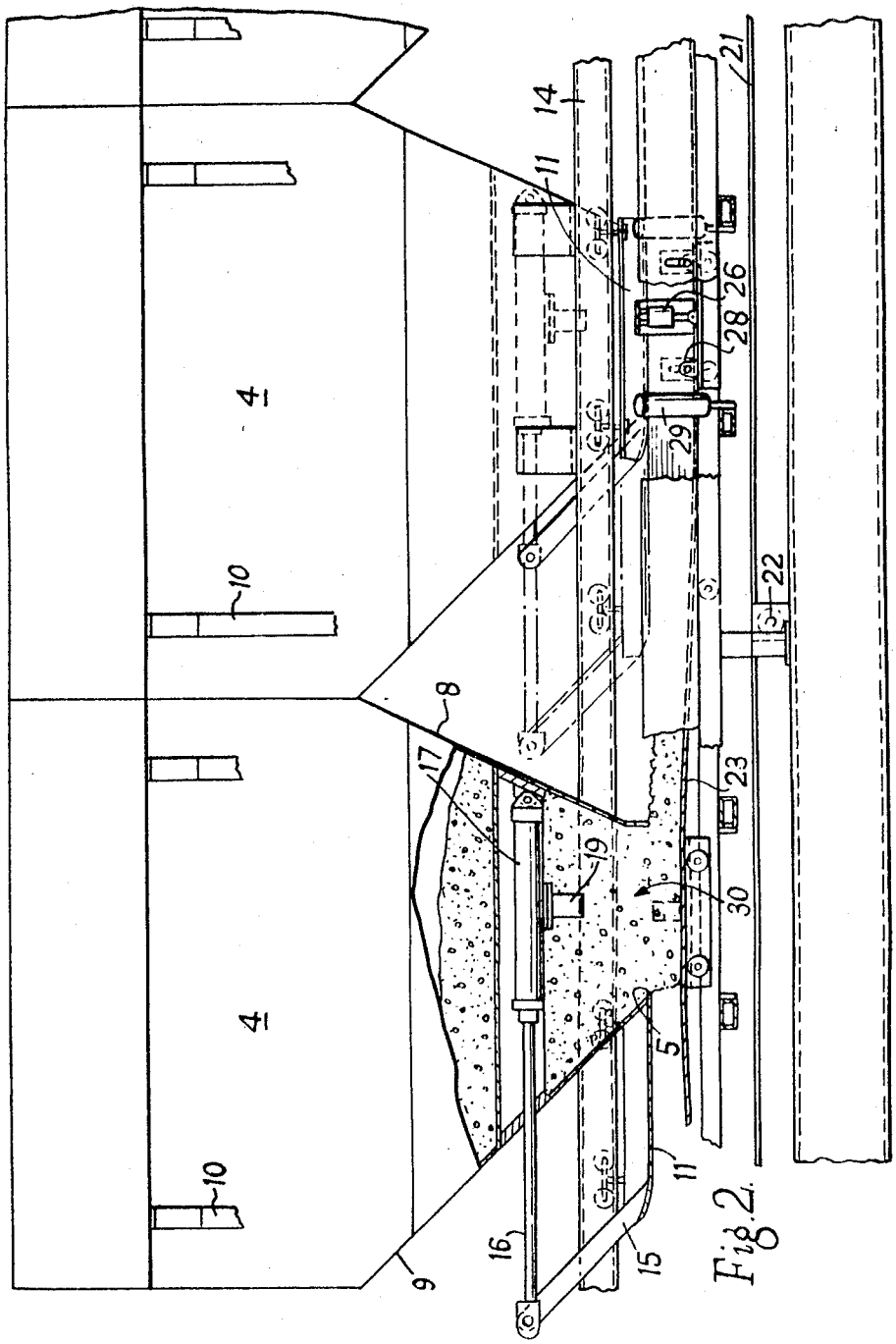
Figure 3:
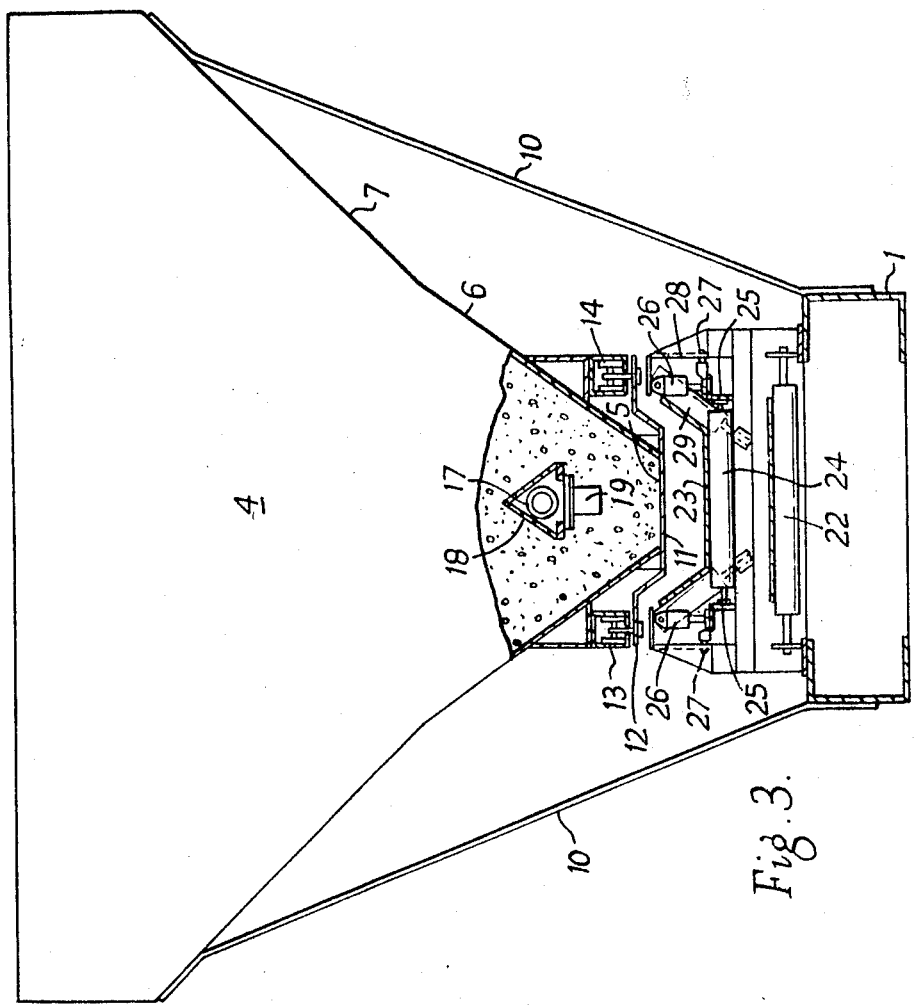

A mixer vehicle in accordance with the present invention is illustrated by way of example in the accompanying drawings, in which:

FIGURE 1 is a side elevation of the vehicle, shown with its mixing trough raised in the normal travelling condition of the vehicle, FIGURE 2 shows part of the vehicle seen in FIGURE 1, on an enlarged scale, and with parts cut away, FIGURE 3 is an end elevation of one of the hopper compartments of the vehicle body, partly in cross section, FIGURE 4 illustrates the rear end part of this vehicle with the mixing trough in its lowered and operative condition, and FIGURE 5 is a diagram illustrating the hydraulic system of the vehicle.

The vehicle illustrated comprises a wheeled chassis 1 with a normal driving cab 2. The vehicle body, generally denoted 3, comprises three compartments 4 each of hopper form with sloping sides terminating at the lower end in a discharge aperture 5. These compartments are supported by struts 10 secured to the side bearers of the chassis 1.

It will be noted that, to facilitate discharge of these compartments, the lower parts 6 of the side walls are at a steeper inclination than the other parts 7, and that the lower rear part 8 of the rear end of each hopper compartment is at a steeper angle than the corresponding front wall portion 9.

The discharge aperture 5 of each hopper compartment 4 is controlled, i.e., closed and opened, by a horizontally-sliding door 11. This comprises a plane body portion with longitudinal offset wings 12 suspended from runners 13 which travel in box channels 14 extending longitudinally of the vehicle.

The upturned leading end of each door is connected by a rigid strap 15 to the piston rod 16 of a piston cylinder unit 17 located within the corresponding hopper compartment 4. It is protected in this compartment by a longitudinal metal angle piece 18 arranged apex uppermost and assisting in the discharge of material from the compartment. The protective device 18 has associated therewith a vibrator 19 which (see below) is arranged to be operated when the discharge door is fully opened, thereby to assist in the expulsion of material from the hopper compartment, in conjunction with the vibrating angle piece 18.

Mounted on the chassis below the discharge apertures 5 of the various compartments is an endless conveyor belt of rubber or rubber-like material and generally denoted 20. The lower run 21 of this belt is guided over horizontal idler rollers 22 on chassis 1, and the upper run 23 is deformed into trough shape by guide and support rollers 24 and 29 as it passes below the discharge apertures 5. Thus, associated with each aperture are two or more horizontal support rollers 24 carried by a spaced pair of angle bars 25 which can be raised and lowered by hydraulic capsule rams 26. The bars 25 are provided with guide pins 27 running in slotted brackets 28. The longitudinal margins of the upper run 23 of the belt are deflected upwards by inclined guide rollers 29, of which there are two pairs associated with each aperture 5 disposed near the leading and rear end respectively of the aperture and are fixed in relation to the vehicle chassis but are freely rotatable about their own axes.

The facility for raising and lowering rollers 24 is a feature of this invention and is designed to close the local portion of the upper run of the belt towards any discharge aperture which is to open and discharge. This is to enable the depth of the layer of dry-mixed material discharging from any opened aperture to be controlled. Thus, referring to FIGURE 2, it will be observed that the layer of dry-mixed material, denoted 30, deposited on the upper run of the belt is prohibited from becoming excessive and so interfering with the clear travel of the material below the next following compartment doors 11. It also prohibits an impulsive discharge from a freshly-opened aperture from spilling over the sides of the belt. As is apparent from the foregoing the raising and lowering of belt 23 is performed by the capsule rams 26, which lift the central portion of the belt. The inclined side walls of the same ride up the fixed rollers 29 during the ascent.

The conveyor belt 20 is driven by a hydraulic motor 31 shown here for convenience at the trailing end of the chassis, and at this end is arranged, when in operation, to discharge into the mixing chamber. This is constituted by a trough 32 made of flexible abrasion-resistant rubber or rubber-like material which is pivoted at 33 to a bracket at the rear of the chassis. It is raised from its transit position (seen in FIGURE 1) to its lower and working position (seen in FIGURE 4) by means of a cable and winch 34 at the upper rear end of the vehicle.

Trough 32 has, extending centrally therethrough, a drive shaft 35 operated by a hydraulic motor 36. The inner section of shaft 35 carries paddle blades 37, representing the mixing section of trough 32, and the outer section of shaft 35 is formed with a discharge worm 38. The mixing section of the trough 32 has a perforated water spray pipe 39 mounted thereabove, this being connected to a water tank 40 at the rear of the vehicle. Water is fed to spray tube 39 by a water pump 43 under control of an on/off water valve 41 and a servo-operated variable water flow control valve 42. Valve 42 is under the command of a weighmeter 44 the mechanism of which is controlled by a roller 45 over which the upper run 23 of the belt passes as it approaches the discharge point. This gives a constant indication of the amount of material being delivered into the trough at a time and thus enables the amount of water to be automatically adjusted accordingly. As a second check, the trough 32 is provided with moisture probes 46 disposed thereacross at the end of the mixing section, and these probes control a moisture meter 47 to influence the servo-operated valve 42. A wet mix, the degree of moisture in which is thus strictly controlled, is discharged from the open rear end of trough 32 which, at this part, is provided with a pivotable extension chute 48.

The hydraulic system by means of which the various controls described above are operated is illustrated in FIGURE 5. In this diagram, 49 depicts the control valves for selecting and commencing the operation of lifting the belt, opening the door, and operating the vibrators of the various compartments. Valves 49 control hydraulically-operated capsule rams 26 initiating the raising of the conveyor belt, and, on having approached their operating position to operate trips 51 controlling valves 52. These latter, it will be seen, govern the operation of the door-opening units 17 and valves 53 which set the vibrators 19 into operation. The circuit further includes a cam operated valve 54 activating the vibrators, a main control valve 55 for the mixer screw motor 36, and a similar valve 56 for the belt conveyor motor 31. The hydraulic coil tank is denoted 57 and a hydraulic pump 58.

I claim:

1. In a mixer vehicle comprising a hopper-incorporating container body, a mixing trough with a mixing and conveying device therein, means for receiving dry-mixed material from the container body and mechanically discharging it into said mixing trough, characterized by the fact that the container body is provided at the bottom with a plurality of downwardly-open discharge apertures at successive intervals along the body in the fore and aft direction of the latter, and with an individual horizontally-sliding door controlling the gravity discharge from each such aperture, and an endless belt conveyer is disposed with its upper run beneath the discharge apertures and is adapted to convey to the mixing trough substantially dry-mixed material issuing through each aperture in turn as the doors thereof are opened in succession, whereby the body can be progressively and completely emptied of dry-mixed material.

2. A mixer vehicle according to claim 1, characterised by the fact that the container body is divided up into a plurality of separate compartments each having a hopper-form bottom portion terminating in a discharge aperture closed by a sliding door.

3. A mixer vehicle according to claim 1, including support rollers below the aperture wherein the support rollers related to each discharge aperture are movable in harmony with the sliding door of this aperture to raise the associated part of the upper run of the belt towards the aperture concerned, in response to the opening of this door.

4. A mixer vehicle according to claim 1, characterised by the fact that each sliding door is movable by a hydraulic piston-cylinder unit disposed horizontally above the same within the container body, a protective metal angle piece being provided over this unit and combined with a vibrator to assist the material discharge from the container in response to the opening of the corresponding door.

5. A mixer vehicle according to claim 1, characterised by the fact that the mixing trough has a drive shaft running centrally therethrough with a set of paddle blades along a first section of its length and a worm along a second section, a water feed pipe being disposed above and along this first section wherefore this section serves for admixing the dry-mixed material with water and the worm section for discharging the wet mix.

6. In a mixer vehicle comprising a hopper-incorporating container body, a mixing trough with a mixing and conveying device therein, means for receiving dry-mixed material from the container body and mechanically discharging it into said mixing trough, characterized by the fact that the container body is provided at its lower part with a plurality of discharge apertures and with an individual sliding door controlling each such aperture, and an endless belt conveyor is disposed beneath the discharge apertures and is adapted to convey to the mixing chamber substantially dry-mixed material issuing through any such aperture on opening of the door thereof, supported rollers are provided below the apertures, the support rollers related to each discharge aperture being movable in harmony with the sliding door of this aperture to raise the associated part of the upper run of the belt towards the aperture concerned, in response to the opening of the door.

7. In a mixing vehicle comprising a hopper-incorporating container body, a mixing trough with a mixing and conveying device therein, means for receiving dry-mixed material from the container body and mechanically discharging it into said mixing trough, and means for introducing water into said mixing trough, characterized by the fact that the contained body is provided at its lower part with a plurality of discharge apertures and with an individual sliding door controlling each such aperture, and a belt conveyor is disposed beneath the discharge apertures, and is adapted to convey to the mixing chamber substantially dry-mixed material issuing through any such aperture on opening of the door thereof, each sliding door being movable by a hydraulic piston-cylinder unit disposed horizontally above the same within the container body, a protective metal angle piece being provided over this unit and combined with a vibrator to assist the material discharge from the container in response to the opening of the corresponding door.

References Cited

UNITED STATES PATENTS

| | | | | |
|---|---|---|---|---|
| 2,946,597 | 7/1960 | Simonsen | 259—161 | X |
| 3,310,293 | 3/1967 | Zimmerman | 259—153 | X |
| 3,339,898 | 9/1967 | Futty | 259—178 | X |

ROBERT W. JENKINS, Primary Examiner

U.S. Cl. X.R.

259—178